United States Patent [19]  [11] Patent Number: 5,230,167
Lahoda et al.  [45] Date of Patent: Jul. 27, 1993

[54] REMOVAL OR ORGANICS AND VOLATILE METALS FROM SOILS USING THERMAL DESORPTION

[75] Inventors: Edward J. Lahoda, Edgewood Borough; David C. Grant, Gibsonia, both of Pa.

[73] Assignee: Westinghouse Electric Corp., Pittsburgh, Pa.

[21] Appl. No.: 785,397

[22] Filed: Oct. 30, 1991

[51] Int. Cl.$^5$ .............................................. F26B 21/06
[52] U.S. Cl. ........................................... 34/75; 34/79
[58] Field of Search .................... 34/28, 32, 73, 74, 75, 34/76, 79, 210, 216, 217, 218, 227, 228

[56] References Cited

U.S. PATENT DOCUMENTS

| | | | |
|---|---|---|---|
| 3,432,397 | 3/1969 | Berg | 34/39 |
| 3,954,069 | 5/1976 | Loken . | |
| 4,050,900 | 9/1977 | Hobbs et al. . | |
| 4,738,206 | 4/1988 | Noland . | |
| 4,756,092 | 7/1988 | Anderson et al. | 34/39 |
| 4,782,625 | 11/1988 | Gerken et al. . | |
| 4,864,942 | 9/1989 | Fochtman et al. . | |
| 4,977,839 | 12/1990 | Fochtman et al. . | |

OTHER PUBLICATIONS

*Process Technology and Flowsheets*, McGraw-Hill, 1979, pp. 225-226.
*Contaminated Land Reclamation and Treatment*, Michael A. Smith ed., Plenum Press, 1985, pp. 37-90, "On-Site Processing of Contaminated Soil" by W. H. Rulkens.
EPA Applications Analysis Report, *Shirco Infrared Incineration System*, Jun. 1989, pp. 39-42.

*Primary Examiner*—Henry A. Bennet
*Attorney, Agent, or Firm*—Aileen C. Addessi

[57] ABSTRACT

The removal of organics and volatile metals from soils using thermal desorption comprises moving contaminated materials, positioned on a belt conveyor, through a chamber under oxygen conditions, temperature conditions, and residence time effective to substantially avoid incineration of the contaminants. The method further comprises heating the contaminated material for volatilizing the contaminants and for producing a processed material that is substantially decontaminated. To carry the volatilized contaminants from the chamber, a transport gas may be passed through the chamber countercurrent to the movement of the contaminated material. A gas stream including the volatilized contaminants and the transport gas may be passed through a condenser and through a scrubber for producing a substantially cleaned gas and a contaminated liquid concentrate. The cleaned gas may be recycled back into the chamber as the transport gas or passed through a gas cleaning system prior to discharge into the atmosphere. The liquid concentrate is passed through a water treatment system for producing substantially cleaned water. The water may be passed through an air cooler and recycled back into the quencher or may be passed through a carbon absorption column and recycled as quench water for the processed material.

5 Claims, 3 Drawing Sheets

REMOVAL OR ORGANICS AND VOLATILE METALS FROM SOILS USING THERMAL DESORPTION

BACKGROUND OF THE INVENTION

This invention relates to an apparatus and method for removing volatile and semi-volatile contaminants from solid materials and, more particularly, to an apparatus and method for thermal desorption of organics and volatile metals from soils to separate the contaminants from the soil.

The contamination of soils, sludges, ashes, and other solids by organics and heavy metals is a significant environmental problem. Due to the large volumes involved and expensive disposal costs for these solids, there is a need to reduce the volume of waste requiring disposal.

The contaminated soil may be treated by destruction of the contaminants, such as by incineration or by pyrolysis, or by separation of the contaminants from the soil, such as by thermal desorption. During incineration, the contaminants are heated under oxygen concentrations and residence time to a temperature effective to decompose the contaminants. During pyrolysis, the contaminants are heated in the absence of oxygen for a predetermined residence time to a temperature effective to decompose the contaminants. During thermal desorption, the contaminants are heated under oxygen concentrations and residence time to a temperature effective to avoid decomposition of the contaminants, thereby enabling the separation of the volatilized contaminants from the soil.

An example of an incinerator is the apparatus disclosed in U.S. Pat. No. 4,050,900 (Hobbs et al.), which is herein incorporated by reference for its description of an incineration system utilizing a conveyor belt. Materials are moved through a combustion chamber on a conveyor belt. As the materials advance through the chamber, the materials are incinerated, due to a combination of infrared heating means and combustion of the devolatilized organics, which releases combustion gases. Although incineration reduces the volume of waste requiring disposal, highly toxic combustion products are produced, such as dioxin, which must be effectively treated in the afterburner and scrubbing section. If fixed based incineration facilities are used, large volumes of contaminated materials must be packaged and transported to licensed incineration facilities, which have limited capacity.

The EPA Applications Analysis Report, *Shirco Infrared Incineration System*, June 1989, pages 39–42, discloses utilizing infrared heating elements to heat material positioned on a conveyor belt, which results in desorption of the contaminants from the material within a primary chamber, followed by incineration of the desorbed contaminants in the primary chamber. If combustion of the desorbed contaminants is not complete within the primary chamber, then the desorbed contaminants are incinerated in a secondary chamber, which produces toxic combustion products.

In another incineration process, U.S. Pat. No. 3,954,069 (Loken), sludge is indirectly heated to produce an exhaust gas of air, malodorous gases, and water, which is passed to a condenser. In the condenser, only water is condensed and removed so that the "contaminant" malodorous gas passes to an incinerator.

A process similar to incineration is disclosed in *Process Technology and Flowsheets*, McGraw-Hill, 1979, pages 225–226, in which waste is pyrolyzed at 900° F. to provide oil vapor, gas vapor and water vapor. The vapors are quenched to form pyrolytic fuel oil and off-gas. However, during pyrolysis, the contaminants are decomposed, which may result in residual compounds, such as materials which are hazardous, toxic, or require regulation by the Environmental Protection Agency, remaining in the material.

An example of thermal treatment of soil is disclosed in U.S. Pat. No. 4,738,206 (Noland). Contaminated soil is conveyed through a chamber by a screw conveyor with internally heated flights and vapor stripped at a temperature below the boiling temperatures of the contaminants. This approach, however, will result in the production of very large volumes of gas, which then must be treated for contaminant removal.

Another example of thermal desorption of soil is disclosed in U.S. Pat. Nos. 4,977,839 (Fochtman et al.) and 4,864,942 (Fochtman et al.). Contaminated materials, which are placed in a rotary kiln, are subjected to a temperature effective to volatilize the contaminants, but below the incineration temperature, for a period of time sufficient to effect the desired degree of separation of contaminants. However, incineration is due to a combination of the presence of an oxidizing substance and the residence time of the material at a particular time, and is not due to the temperature at which the process occurs.

U.S. Pat. No. 4,782,625 (Gerken et al.) discloses volatilizing organic compounds in a rotating cylinder having plural flights for moving soil through the cylinder. The material drying means, filtering means, scrubbing means, and bed of activated carbon are individually mounted on the bed of trailers to facilitate transportation of the equipment.

Another description of processes to treat contaminated soil using a rotary kiln can be found in *Contaminated Land Reclamation and Treatment*, Michael A. Smith ed., Plenum Press, pages 37–90, "On-Site Processing of Contaminated Soil" by W. H. Rulkens, 1985. Incineration, treatment with catalysts, and low temperature vaporization of contaminants are disclosed. In low temperature treatment of off-gas, Rulkens discloses the use of steam as a carrier gas, cyclone filtering, condensing, gas scrubbing, separation of gas from the resulting contaminated liquid, and filtering the gas through activated carbon before discharging the gas.

However, utilization of the rotary kiln, the rotating cylinder, or the screw conveyor has several disadvantages. Due to the tumbling of the material within the drum, which may cause portions of the material to progress through the drum at different rates, the residence time of the material within the rotating drum to effect the desired degree of separation is variable.

Another disadvantage to the utilization of the rotary kiln and the screw conveyor is the limited heat transfer rates through the shell of the kiln or through the flights of the screw, which limits the throughput of these processes. Also, the soil or debris final temperature is limited by the materials of construction of the kiln and screw conveyor because the flame temperature required to obtain the desired heat transfer through the material to volatilize the contaminants may cause damage to the kiln and screw conveyor, such as material fatigue and melting of the rotary kiln and screw conveyor. Utilization of a lower temperature to volatilize the contaminants requires a longer residence time of the material within the thermal desorption unit.

Another disadvantage to the utilization of a rotating drum is the production of dust within the drum due to the tumbling of the material, which makes it difficult to treat the off-gas, produces a large amount of contaminated waste and can lead to operational problems, such as pipe blockages.

Therefore, what is needed is an improved apparatus and method that efficiently separates the contaminates from the contaminated material, that has an increased throughput, and that does not produce additional toxic materials.

SUMMARY OF THE INVENTION

A method for removing contaminants from contaminated material, such as contaminated soil, comprises moving the contaminated material positioned on a belt conveyor through a chamber from an inlet end of the chamber to a discharge end of the chamber under oxygen concentration conditions, temperature conditions, and residence time effective to substantially avoid incineration of the contaminated material and the contaminants. The contaminated material positioned on the belt conveyor in the chamber is heated as the contaminated material moves through the chamber to a temperature effective for volatilizing the contaminants and for producing a processed material that is substantially decontaminated.

The volatilized contaminants are discharged from the inlet end of the chamber and the processed material is discharged from the discharge end of the chamber. The volatilized contaminants are condensed for separating the volatilized contaminants into a gas stream and a contaminated liquid condensate, which may be further processed.

The method may further comprise passing a gas through the chamber countercurrent to the movement of the contaminated material on the belt conveyor for transporting the volatile contaminants from the chamber.

The method may further comprise drying the contaminated material prior to entry of the contaminated material into the chamber, preventing air from entering the chamber, scrubbing the condensed gas stream, recycling at least a portion of the gas, recycling at least a portion of the water, cleaning at least a portion of the scrubbed gas in a gas cleaning system, treating the contaminated liquid condensate in a water treatment system, and treating at least a portion of the water in a carbon absorption column.

A thermal desorption unit for removing volatile and semi-volatile contaminants from contaminated materials comprises a chamber having an inlet end and a discharge end, a belt conveyor for moving the contaminated material through the chamber, at least one heater positioned within the chamber above the belt conveyor for heating the contaminated material for volatilizing the contaminants and for producing a processed material, and means for maintaining air, temperature, and time conditions effective to avoid incineration of the contaminated material.

The thermal desorption unit further comprises means for passing a gas above the contaminated material positioned on the belt conveyor and countercurrent to the movement of the contaminated material through the chamber for carrying the volatilized contaminants from the chamber and a quencher positioned at one end of the chamber for condensing at least a portion of the volatilized contaminants discharged from the chamber.

The thermal desorption unit and process utilizing a belt conveyor with indirect heating within the chamber enables a larger quantity of the contaminated material to be decontaminated in a smaller chamber with a shorter residence time than is required for volatilization of the contaminants utilizing other means, such as a rotary kiln. In addition, dust carry over is minimized, the residence time is controlled, and higher matrix temperatures are achievable.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

The invention described herein provides an apparatus and method for thermally desorbing contaminants from contaminated solid materials, thereby separating the volatile contaminants from the sold materials.

A thermal desorption unit, referred to generally as 10, is capable of evaporating water, volatile contaminants, such as PCB's (polychlorinated biphenyls), PHC's (petroleum hydrocarbons), and PCP's (pentachlorophenols), and semi-volatile metal or metallic compounds, such as antimony, lead, cadmium, zinc, or mercury.

Figure 1:
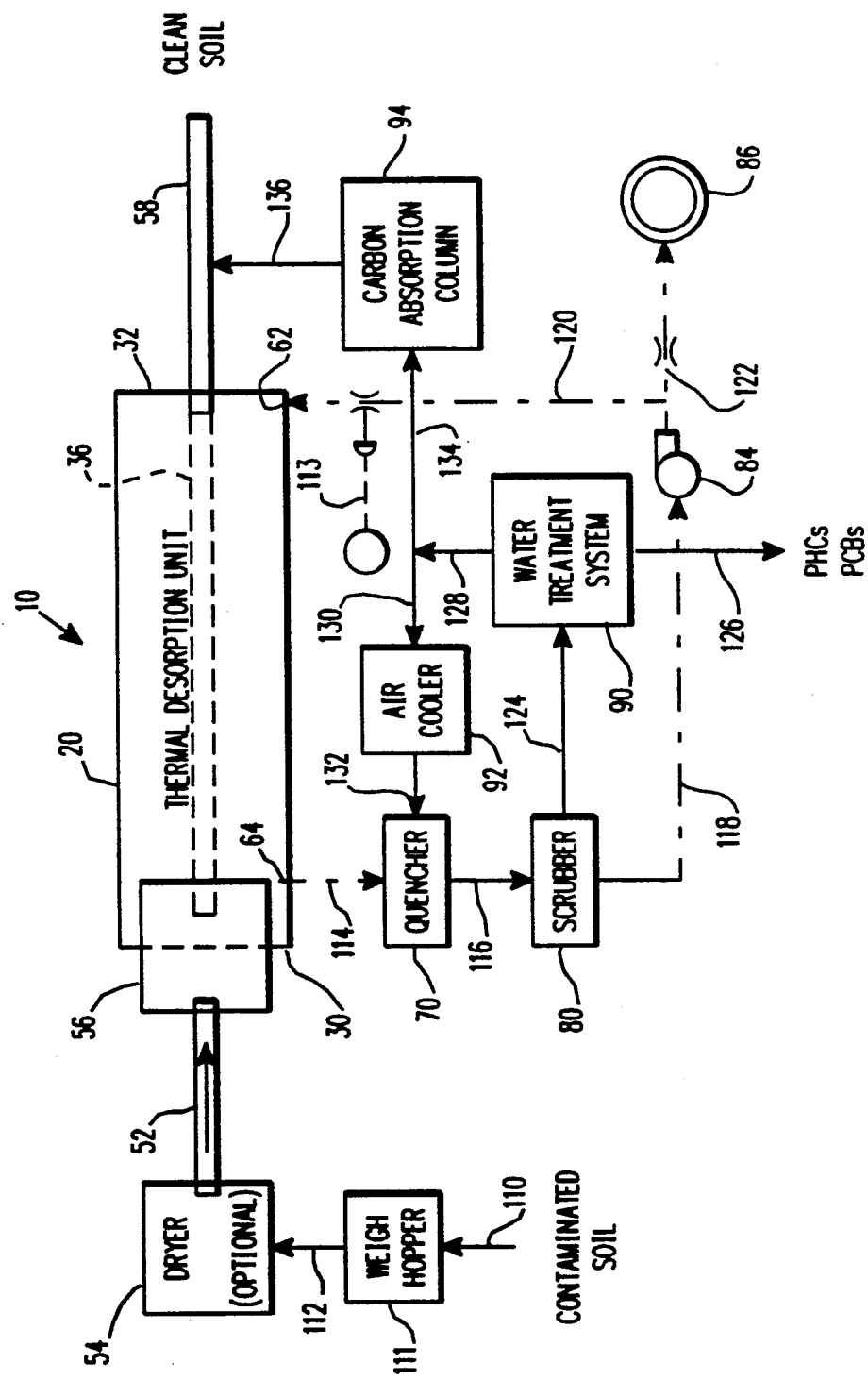
FIG. 1 is a schematic representation of a system for thermally desorbing contaminants from contaminated materials.
Figure 2:
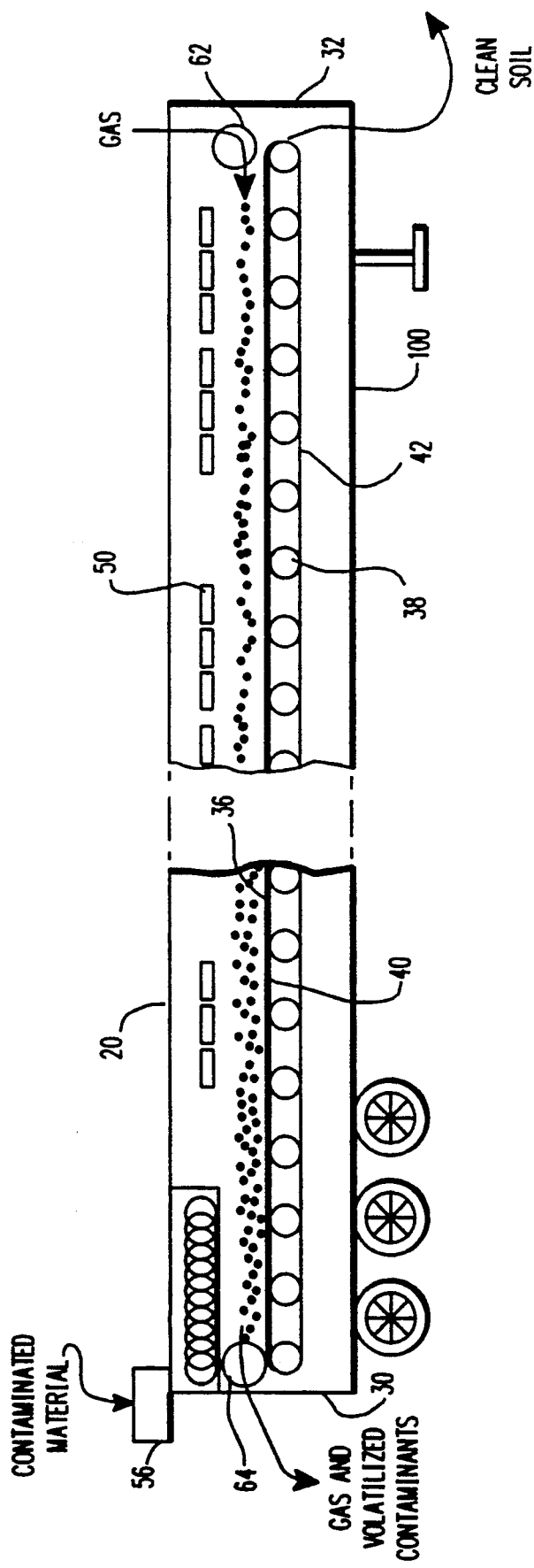
FIG. 2 is a schematic representation of a trailer housing a thermal desorption unit having a conveyor belt.

Referring to FIGS. 1 and 2, the thermal desorption unit 10 includes a chamber 20. The chamber 20 is a housing, having a plurality of walls, which is substantially airtight. The chamber 20 has an inlet end 30 for receiving material into the chamber 20 and a discharge end 32 for discharging material from the chamber 20. The chamber 20 is constructed of mild carbon steel and is insulated with ceramic fiber. To protect the shell from corrosive volatiles, the interior steel surfaces are sprayed with a corrosion resistant material before installing the insulation, and a stainless steel vapor barrier, which may include an additional layer of fiber insulation, is positioned adjacent to the ceramic fiber.

The chamber 20 houses a belt conveyor 36, which may be constructed from a metal alloy or ceramic cloth, for transporting the contaminated material through the chamber 20. The belt conveyor 36, which is supported on rollers 38, has an upper belt portion 40 for moving the material from the inlet end 30 to the discharge end 32 of the chamber 20 and a lower belt portion 42 positioned below the upper belt portion, 38. A rotary drier, such as a rotary kiln or rotating drum, cannot be substituted for the belt conveyor 36 due to the variable residence time of the material within the rotary drier, the limited heat transfer rates, the limited range of temperatures of the material, and the aeration of particulates within the volatilized contaminants.

Positioned within the chamber 20 are turning bars (not shown) with an array of attached teeth which slowly rake through the material layer positioned on the belt conveyor 36 as the material moves through the chamber 20, for increasing contaminant removal. The plurality of turning bars are positioned along the length of the belt conveyor 36 with the teeth positioned so that all of the material is turned as it moves along the length of the belt conveyor 36. The turning bars turn the material to ensure that all of the contaminants are exposed to the heat, but do not create particulates floating in the space above the belt conveyor 36.

The turning bars do not disturb the rate of movement of the material on the conveyor belt 36 as compared to a rotary kiln. A rotary kiln overturns the material creating the possibility of a portion of the material progressing through the chamber at a different rate than the rate of progress of another portion of the material progressing through the chamber. A consistent rate of movement of the contaminated material through the chamber 20 on the belt conveyor 36 enables a known residence time to be determined, as compared to the variable amount of time that a particular portion of material remains within a rotary kiln. By knowing the residence time needed for effective volatilization of a particular contaminant at a certain temperature, the length of time the material is held within the chamber 20 is minimized, thereby increasing the throughput of the material through the thermal desorption unit 10.

A plurality of heaters 50 are positioned above the belt conveyor 36 for heating the material as the material moves through the chamber 20 on the belt conveyor 36. The heaters 50 may be infrared heaters, radio frequency heaters, or microwave heaters. The utilization of these heaters allows very high temperatures to be obtained in the contaminated material because heat transfer surfaces and their materials of construction are not a consideration. Preferably, infrared heaters are utilized, thereby enabling the material to be directly heated by convection and conduction and indirectly heated by radiation. Because the material moves through the chamber 20 at a constant rate and because the requisite temperatures can be obtained by utilization of the belt conveyor 36, the residence time of the contaminated material in the chamber 20 can be precisely controlled.

While the required oxygen concentrations and residence time of the material within the chamber 20 are maintained, the heaters 50 are capable of heating the contaminated material to a temperature effective to volatilize the contaminants, without incinerating or pyrolyzing the contaminants. The heaters 50 heat the material to a temperature between the range of approximately 212° F. (100° C.) to 1250° F. (680° C.) for volatilizing the contaminants from the solid material. Preferably, the material is heated to at least about 850° F. (450° C.) for a PCB contaminated material. The heaters 50 are connected to a control panel (not shown) for supplying and controlling electric power to the heaters 50.

The chamber 20 is substantially airtight for preventing air from entering the chamber 20. Reducing the quantity of air within the chamber 20 reduces the possibility of volatilized contaminants leaking from the chamber 20 into the atmosphere. By preventing air from entering the chamber 20, there is a smaller volume of gas circulation within the chamber 20, which minimizes dust and particulate materials flowing above the belt conveyor 36, thereby increasing the efficiency of removal of the volatilized contaminants. Also, because the conditions necessary for incineration are a combination of the quantity of air, the temperature, and the residence time within the chamber 20, the prevention of air from the chamber 20 reduces the possibility of incineration of the contaminants, thereby minimizing the formation of highly toxic combustion products, such as dioxins and dibenzofurans.

A feed conveyor 52 moves the contaminated material from a supply source, such as dryer 54, to a feed hopper 56, which is positioned adjacent to the inlet end 30 of the chamber 20. The feed hopper 56 may have a plurality of screw conveyors (not shown) rotatably mounted within an elongated housing, for moving the contaminated material into the chamber 20. The screw conveyors filled with the contaminated material act as a seal and prevent air from entering the chamber 20.

A conveyor 58 positioned adjacent to the discharge end 32 of the chamber 20 removes the substantially decontaminated processed material from the chamber 20.

The chamber 20 has a gas inlet duct 62 for passing a flow a gas into the chamber 20 countercurrent to the movement of the contaminated material through the chamber 20. The transport gas will carry the volatilized contaminants from the discharge end 32 of the chamber 20 towards the inlet end 30 of the chamber 20. Preferably, the gas will flow above the contaminated material positioned on the belt conveyor 36. By preventing the flow of gas through the contaminated soil, the presence of dust and fines above the belt conveyor 36 will be reduced, thereby decreasing the amount of contaminated waste produced by the process. The countercurrent flow of the transport gas has a velocity sufficient to sweep the contaminants from the chamber 20, such as a velocity of approximately 0.2 ft/sec (0.06 m/sec) to 2.5 ft/sec (0.75 m/sec). The gas carrying the contaminants is discharged from the chamber 20 through a gas outlet duct 64 positioned near the inlet end 30 of the chamber 20.

The dryer 54, which is optional, is used to evaporate water from the contaminated material prior to the contaminated material entering the chamber 20. By removing the water prior to thermal desorption, the quantity of heat and residence time required within the chamber 20 to desorb the contaminants is less than that required to desorb the contaminants and the water within the chamber 20.

The processed material discharged from the chamber 20 is quenched with water for cooling the material. The steam produced by the quenching may be recirculated through the system by passing the steam into the chamber 20 as the transport gas for carrying the volatilized contaminants from the chamber 20. Preferably, the steam is not admitted into the chamber 20 until the temperature of the outlet soil from the chamber 20 is greater than 212° F. (100° C.) for preventing the steam from condensing on the soil surface. Alternatively, nitrogen or carbon dioxide may be used as the gas for carrying the volatilized contaminants from the chamber 20.

A quencher 70 is positioned adjacent to the chamber 20 for condensing the gas exiting from the gas outlet duct 64 of the chamber 20. Preferably, a direct, water spray contact condenser is utilized. Water is sprayed into the gas mixture in the quencher 70 to produce a water saturated gas. The gas may be quenched to a temperature of approximately 212° F. or lower. By condensing the gas, as compared to incineration of the gas, the liquid condensate may be easily transported to another site for further processing. Also, the use of a quencher to process the volatilized contaminants does not produce toxic by-products, as is produces by incineration of the volatilized contaminants.

Still referring to FIG. 1, a scrubber 80 is positioned adjacent to the quencher 70 for removing particulates from the water saturated gas. When a high pressure spray impacts the gas within the scrubber 80, the particulates attach to droplets of water. The particulates, including the contaminants, are removed from the scrubber 80 separately from the removal of gas from the scrubber 80.

As an example, a Calvert Collision Scrubber from Calvert Inc. may be utilized as the scrubber 80. Gas entering the Calvert Collision Scrubber is split into two gas streams prior to entering the primary atomization zones, similar to venture scrubber throats. The drops of water collect particles as the drops of water are accelerated toward the collision zone in the center of the throat. In the collision zone, the drops of water, because of their inertia, travel into the opposing gas stream, where the drops attain in a relative velocity twice that in the primary atomization zone. This collision process shreds the water drops into fine drops, which more effectively collect submicron particles and produce a large mass transfer area for gas absorption. The substantially particulate-free gas stream flows to a de-entrainment section, where liquid droplets are removed, for separating the liquid from the gas.

The scrubbed gas is drawn from the scrubber 80 by an induced draft blower 84. A portion of the gas is passed through a gas cleaning system 86, such as a stack with activated carbon, which provides an additional organic contaminant removal step. A portion of the gas may be recycled by passing the gas into the chamber 20 as the transport gas.

The water removed from the scrubber 80 is passed to a water treatment system 90, such as an oil/water separator. The water treatment system 90 removes contaminants, such as PCB and PHC, and soil fines. The contaminants discharged from the water treatment system 90 may be sent to an incineration facility for further processing.

A portion of the treated water is passed through an air cooler 92 and returned to the quencher 70, for cooling the gas outlet stream from chamber 20. The air cooler 92 may comprise an indirect, water cooled spray tower or dry cooling system.

A portion of the treated water is passed through a residual treatment system 94, which may include activated carbon, ion exchange, precipitation and flocculation, for providing an additional treatment process for the water. The water passed through the residual treatment system 94 is recycled by using the water to quench the processed soil exiting the chamber 20.

A control system (not shown) houses the controls required to operate the subsystems of the thermal desorption process. A control cabinet (not shown) houses the system alarms, annunciators, recorder, process controllers, and process indicators.

As an example, the hourly throughput for the thermal desorption process is at least about 1 ton per hour of soil. Preferably, the throughput is at least about 10 tons per hour. The thermal desorption unit 10 permits at least approximately 15 tons per hour throughput of soil.

The residence time of the soil in the chamber 20 of the thermal desorption unit 10 is within the range of approximately five minutes to 60 minutes.

As an illustration, the estimated final PCB levels achievable utilizing the thermal desorption unit and process are approximately 1 ppm or less. To effectively remove PCB's, the contaminated material is heated to above approximately 850° F. (450° C.) with a residence time of approximately two to 20 minutes at approximately 850° F. As an example, approximately 20,700 lb/hr of soil contaminated with PCB's can be processed in the chamber 20 at a temperature of approximately 950° F. and a residence time of approximately 6 minutes. PCB's are used for illustration only. Organics, volatile metals, and their salts can also be removed.

The capacity of the thermal desorption system is dependent upon the characteristics of the feed material. The feed capacity is primarily determined by the contaminant desorption rates, the thermal conductivity, and the percent moisture of the feed. Other important variables are heat capacity of the bed of contaminated material, thermal conductivity of the bed, density of the soil, and absorptivity of the soil.

Contaminated material may be transported from a contamination site to a permanent facility housing the thermal desorption unit 10. Alternatively, the thermal desorption unit 10 may be transported to the contamination site for on site processing of the contaminated material.

The description and arrangement of several of the components utilized in the thermal desorption process, such as the heaters 50 and the belt conveyor 36, are described in U.S. Pat. No. 4,050,900.

Referring to FIG. 2, the chamber 20 of the thermal desorption unit 10, the feed hopper 56, the belt conveyor 36, and the heaters 50 are housed on a first trailer 100.

Figure 3:
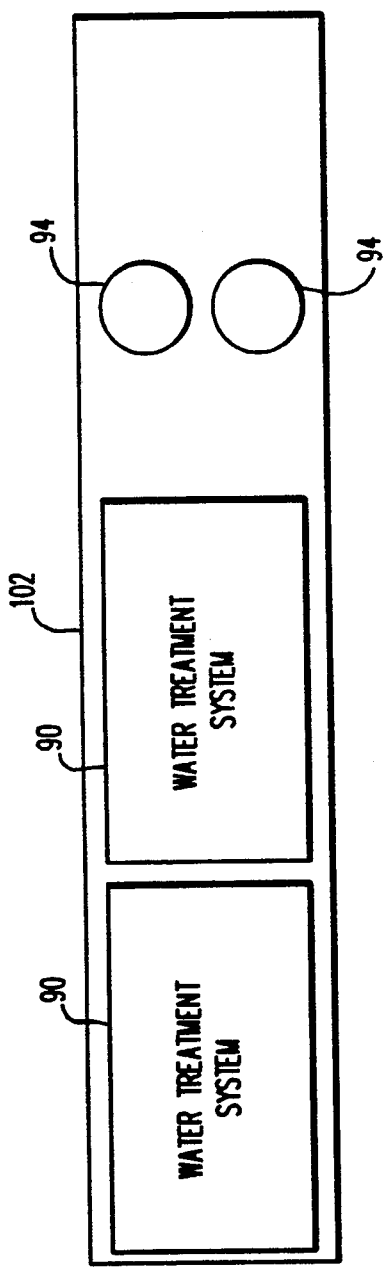
FIG. 3 is a schematic representation of a trailer housing a water treatment system.

Referring to FIG. 3, a second trailer 102 houses a plurality of the water treatment systems 90 and a plurality of the carbon absorption columns 94.

Figure 4:
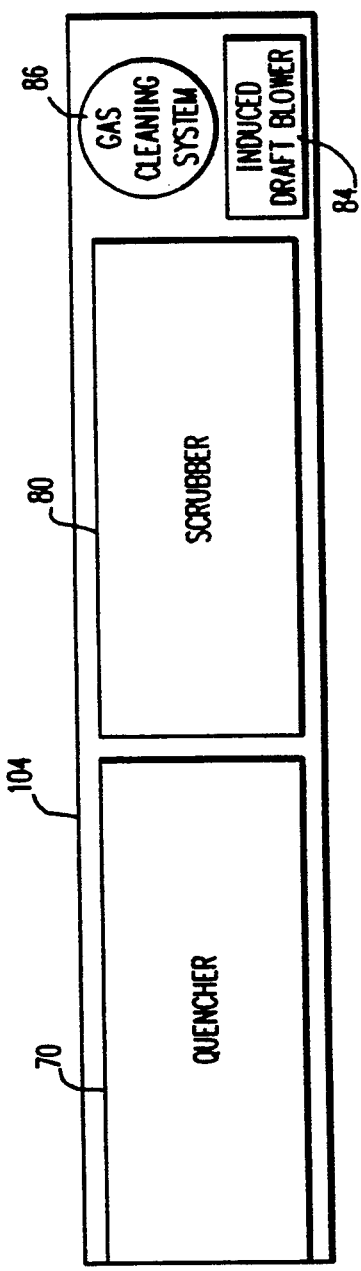
FIG. 4 is a schematic representation of a trailer housing a gas treatment system.

Referring to FIG. 4, a third trailer 104 houses the quencher 70, the scrubber 80, the induced draft blower 84, and the gas cleaning system 86.

Figure 5:
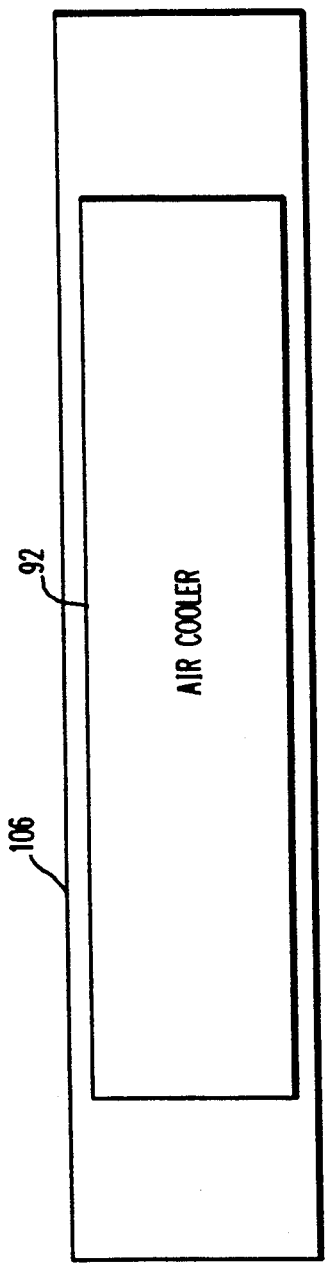
FIG. 5 is a schematic representation of a trailer housing a recycle water cooling system.

Referring to FIG. 5, a fourth trailer 106 houses the air cooler 92. Various other pieces of equipment, such as transformers, pumps, and the control system, may be housed on additional trailers (not shown).

OPERATION

Preparation equipment (not shown) processes the contaminated material to produce a feed stream with individual pieces smaller than 1 inch. Referring to FIGS. 1 and 2, after processing, the contaminated material is placed through stream 110 into a weigh hopper 111, which maintains a constant feed rate of contaminated material to chamber 20.

The use of dryer 54 is optional. If the contaminated material is conveyed from the weigh hopper 111 into the chamber 20, the heaters 50 within the chamber 20 will evaporate the water from the contaminated material prior to thermally desorbing the contaminants. If the contaminated material is conveyed from the weigh hopper 111 to the dryer 54 through stream 112, then the contaminated material is heated within the dryer 54, which evaporates the water from the contaminated material. By removing the water prior to entry of the contaminated material into the chamber 20, less energy is needed to thermally desorb the contaminants from the material and the residence time of the contaminated material within the chamber 20 is reduced. Because the contaminated material may be a wet sludge, which may clog the screw conveyors of the feed hopper 56, by drying the contaminated material in the dryer 54 prior to entry of the material into the chamber 20, the wet sludge is converted to separate fragments of material, which do not clog the feed hopper 56. Also, the dried material is more readily handleable, than the wet sludge.

The contaminated material is conveyed to the feed hopper 56 on the feed conveyor 52, which is substantially enclosed. The contaminated material falls through the opening in the top of the chamber 20 and forms a one to two inch layer across the width of the belt conveyor 36.

The chamber 20 of the infrared thermal desorption unit 10 operates at a slight vacuum, such as about 0.1 inch of water, for reducing the leakage of volatilized contaminants from the chamber 20 into the atmosphere. The contaminated material is heated by the heaters 50 as the material moves through the chamber 20 positioned on the belt conveyor 36. The material will be heated to a temperature effective to volatilize the contaminants from the soil, such as within the range of 212° F. (100° C.) to 1250° F. (680° C.).

A flow of gas through stream 113 enters the chamber 20 through the gas inlet duct 62 and transports the volatilized contaminants countercurrent to the flow of the contaminated material on the belt conveyor 36 above the belt conveyor 36. The gas and the volatilized contaminants exit the chamber 20 through the gas outlet duct 64.

The vapor product off-gas including the gas and the volatilized contaminants passes through stream 114 to the quencher 70, which provides a cold water shower for lowering the temperature of the gas to below its saturation point to condense the vapor product off-gas. From the quencher 70, the gas stream passes through stream 116 to the scrubber 80, which uses water droplet contact for removing solids and contaminants from the gas stream. A gas stream and a contaminated liquid condensate will exit from the scrubber 80.

The cleaned gas stream is drawn through stream 118 by the induced draft blower 84 from the scrubber 80. A portion of the cleaned gas stream may pass through stream 120 for entry into the chamber 20 through the gas inlet duct 62 for recycling the gas. The remainder of the cleaned gas stream passes through stream 122 into the gas cleaning system 86 for an additional cleaning step prior to discharge into the atmosphere.

The contaminated liquid condensate passes through stream 124 into the water treatment system 90 for removal of an oil contaminant sludge phase using gravitational settlement. The cleaned water may also be additionally treated by flocculation, gravity settling, or carbon absorption to remove the remainder of the contaminants. The oil sludge and absorbed contaminants are passed through stream 126 and are removed from the site for further processing.

The decontaminated water passes through stream 128 and a portion of the decontaminated water is passed through stream 130 into the air cooler 92 and then through stream 132 into the quencher 70 for recycling the water. A portion of the decontaminated water is passed through stream 134 into the residual treatment system 94 for removing residual organics and metals and then passed through steam 136 for quenching the clean soil exiting the chamber 20 for recycling the water.

Clean soil drops off the end of the belt conveyor 36 and onto the conveyor 58, exiting the thermal desorption unit 10 through the discharge end 32 of the chamber 20. After the quenching of the clean soil discharged from the chamber 20 to lower the temperature of the soil, the soil is returned to the environment. At least a portion of the steam produced by quenching the clean soil is recycled by passing the steam into the chamber 20 as the transport gas.

Therefore, the invention provides an apparatus and method for removing volatile contaminants from contaminated soil by heating the contaminated material under oxygen concentrations, temperature conditions, and residence time effective to thermally desorb the contaminants from the material without incinerating the contaminants.

We claim:

1. An apparatus for removing volatile and semi-volatile contaminants from contaminated materials, comprising:

a chamber having an inlet end and a discharge end;

a belt conveyor for moving the contaminated material through the chamber from the inlet end of the chamber to the discharge end of the chamber;

at least one heater positioned within the chamber above the belt conveyor for heating the contaminated material positioned on the belt conveyor as the contaminated material moves through the chamber for volatilizing the contaminants and for producing a processed material;

means for maintaining oxygen concentrations, temperature, and time conditions effective to substantially avoid incineration of the contaminates;

means for passing a steam transport gas above the contaminated material positioned on the belt conveyor for carrying the volatilized contaminants from the chamber; and a quencher positioned at one end of the chamber for condensing at least a portion of the volatilized contaminants discharged from the chamber.

2. An apparatus for removing volatile and semi-volatile contaminants from contaminated materials, comprising:

a chamber having an inlet end and a discharge end;

a belt conveyor for moving the contaminated material through the chamber from the inlet end of the chamber to the discharge end of the chamber;

at least one heater positioned within the chamber above the belt conveyor for heating the contaminated material positioned on the belt conveyor as the contaminated material moves through the chamber for volatilizing the contaminants and for producing a processed material;

means for maintaining oxygen concentrations, temperature, and time conditions effective to substantially avoid incineration of the contaminates;

means for passing a transport gas above the contaminated material positioned on the belt conveyor for carrying the volatilized contaminants from the chamber;

a quencher positioned at one end of the chamber for condensing at least a portion of the volatilized contaminants discharged from the chamber, and a scrubber positioned adjacent to the quencher for removing desorbed contaminants from a gas stream.

3. The apparatus according to claim 2, further comprising a gas cleaning system positioned adjacent to the scrubber for cleaning a gas stream vented from the scrubber.

4. The apparatus according to claim 2, further comprising a water treatment system positioned adjacent the scrubber system for removing the organic contaminants from the water.

5. The apparatus according to claim 4, further comprising a residual treatment system positioned adjacent the water treatment system for removing residual contaminants from the water.

* * * * *